United States Patent

Kao et al.

[11] Patent Number: 5,989,749
[45] Date of Patent: Nov. 23, 1999

[54] STAMPED BATTERY GRID

[75] Inventors: Wen-Hong Kao, Brown Deer; Edward N. Mrotek, Grafton, both of Wis.

[73] Assignee: Johnson Controls Technology Company, Plymouth, Mich.

[21] Appl. No.: 08/979,984

[22] Filed: Nov. 26, 1997

[51] Int. Cl.[6] .................................................. H01M 4/74
[52] U.S. Cl. ........................................ 429/241; 429/211
[58] Field of Search .................... 29/2; 429/233, 429/241, 211

[56] References Cited

U.S. PATENT DOCUMENTS

| | | | |
|---|---|---|---|
| 1,524,610 | 1/1925 | Ahlgren . | |
| 2,079,727 | 5/1937 | Wirtz . | |
| 2,881,105 | 4/1959 | Gullet . | |
| 3,009,459 | 11/1961 | Ruben . | |
| 3,408,236 | 10/1968 | Van Hartesveldt . | |
| 3,486,942 | 12/1969 | Hatterschide . | |
| 3,629,388 | 12/1971 | Wolf et al. | 264/219 |
| 3,779,816 | 12/1973 | Mao | 148/6.3 |
| 3,989,539 | 11/1976 | Grabb | 429/241 |
| 4,151,331 | 4/1979 | Hug et al. | 429/94 |
| 4,189,533 | 2/1980 | Sugalski | 429/223 |
| 4,196,757 | 4/1980 | Hug et al. | 141/1.1 |
| 4,199,849 | 4/1980 | Moreau | 29/2 |
| 4,221,032 | 9/1980 | Cousino et al. | 29/2 |
| 4,320,183 | 3/1982 | Qureshi | 429/211 |
| 4,345,452 | 8/1982 | Eberle | 72/452 |
| 4,358,892 | 11/1982 | Turillon et al. | 29/623.5 |
| 4,455,724 | 6/1984 | Sperling et al. | 29/2 |
| 4,477,546 | 10/1984 | Wheeler et al. | 429/211 |
| 5,264,306 | 11/1993 | Walker, Jr. et al. | 429/160 |
| 5,308,719 | 5/1994 | Mrotek et al. | 429/241 |
| 5,350,645 | 9/1994 | Lake et al. | 429/124 |
| 5,506,062 | 4/1996 | Flammang | 428/614 |
| 5,543,250 | 8/1996 | Yanagihara et al. | 429/241 |
| 5,578,398 | 11/1996 | Jenkins et al. | 429/233 |
| 5,582,936 | 12/1996 | Mrotek et al. | 429/241 |
| 5,595,840 | 1/1997 | Henning et al. | 429/210 |

FOREIGN PATENT DOCUMENTS

| | | | |
|---|---|---|---|
| 0 589 549 | 9/1993 | European Pat. Off. | H01M 4/73 |
| 60-150556 | 8/1985 | Japan . | |
| 2 127 614 | 4/1984 | United Kingdom | H01M 4/73 |

OTHER PUBLICATIONS

S. Goodman, "Plates with improved conductivity", *Batteries International*, pp. 88–89, 1994 (Jul.).

*Primary Examiner*—Maria Nuzzolillo
*Assistant Examiner*—Susy Tsang
*Attorney, Agent, or Firm*—Quarles & Brady LLP

[57] ABSTRACT

A stamped grid for a lead-acid battery having a grid pattern that is optimized for electrical performance. The stamped grid includes an electrically conductive grid body having opposed top and bottom frame elements, opposed first and second side frame elements and a plurality of interconnecting grid wire elements forming a grid pattern. The grid wire elements include a plurality of vertical wire elements electrically connected to both top and bottom frame elements, a plurality of vertical wire elements connected to the top frame element and one of either the first or second side frame elements and a plurality of cross grid elements that interconnect the vertical wire elements. Each of the vertical grid elements that is electrically connected to the top frame element and one of either the first or second side frame elements includes a plurality of the cross frame elements connected thereto at a substantially 90° angle. The vertical grid elements and the cross frame elements define open areas for supporting electrochemical paste where most of the open areas are within the two percent of being the same size.

22 Claims, 1 Drawing Sheet

STAMPED BATTERY GRID

BACKGROUND OF THE INVENTION

1. Technical Field

The present invention relates generally to grids used in a battery and, more particularly, to a stamped battery grid for a lead-acid battery that is configured to optimize electrical performance, reduce weight and maintain battery life characteristics.

2. Discussion of the Related Art

Grids for lead-acid batteries provide structural support for the active material therein, and also serve as a current collector during discharge and current distributor during recharge of the battery. Accordingly, grid designs seek to optimize the amount of active material supportable by the grid to increase the current collection and distribution characteristics of the grid while minimizing the grid weight. Attempts to optimize the current conducting capabilities while minimizing the weight of the grid have led to numerous grid designs. Manufacturing methods and the disadvantages associated therewith have, however, limited the ability to manufacture even a greater number of grid patterns that have increased conduction capabilities and reduced weight.

Battery grids are commonly manufactured by processes such as casting, expanded metal forming, and stamping. Cast grids have been used for many years and are manufactured by pouring molten lead into a mold, allowing the lead to cool, and then separating the grid from the mold. Cast grids suffer from higher porosity, as compared to expanded metal or wrought grids, and a roughened surface finish. Each of these features may lead to grid corrosion which is a substantial cause of battery failures. Moreover, mold constraints inherent in the casting process limit the wire patterns that may be formed by casting. Further limitations due to mold constraints limit wire shapes and lead distributions that in turn affect grid electrical performance and efficiency. Further disadvantages of the casting process include the need to use a mold coating to facilitate ejection of the grid from the mold, as well as the use of multiple molds to increase production output. These process constraints introduce undesirable grid variations. Finally, the casting process is not "continuous" in the sense that the work material does not pass through the process from start to finish. Rather, work-in-process is collected at each processing station and passed in batches to the next processing stage.

While many disadvantages of the cast grids are addressed by the present invention, of particular concern is the limitations on wire patterns, wire shapes and lead distributions caused by mold constraints, Particularly, casting molds for battery grids generally provide for the infusion of a lead alloy along the horizontal wires of the grid. The lead alloy is introduced into the mold at the ends of recesses for the horizontal wires, and from there the lead alloy flows through the horizontal wire recesses into the connecting vertical wire recesses to form the vertical wires. To ensure complete formation of the vertical grid wires, the spacing between adjacent horizontal wires is limited, thereby limiting the size of the palette that accommodates the paste filler. Moreover, the manufacturing limitations of casting requires that the horizontal wires be continuous and parallel to one another thereby further limiting the grid patterns manufacturable by this process.

Grids are also formed by expanding metal through a process in which a strip of cast or wrought lead material is pierced and then pulled or expanded. Expanded metal grids offer higher productivity than cast processing because the expanded metal process in continuous, i.e. a strip of lead material enters the process and finished grids are the output thereof. However, expanded metal grids are also limited in wire pattern, wire shape, and lead distribution. Additionally, expanded metal grids include stress zones created from the expansion which lead to corrosion. While corrosion may be reduced through the addition of precious metal additives, such as silver, the off-set in corrosion results in an increase in manufacturing costs.

U.S. Pat. No. 5,582,936 issued to Mrotek et al., assigned to the assignee of the instant invention and herein incorporated by reference, discloses a grid for a lead-acid battery plate that has been formed by a casting process. The Mrotek et al. battery grid includes features to optimize the current flow in the grid, while reducing the amount of lead in the grid to keep the grid weight at a minimum. However, the Mrotek et al. battery grid in the '936 patent suffers from the various disadvantages discussed above that are inherent in the grid casting process.

The present invention incorporates some of the techniques in the '936 patent to optimize the electrical performance and reduce the weight of the grid, and includes additional features to provide other characteristics that are not possible in a cast type grid.

SUMMARY OF THE INVENTION

In accordance with the teachings of the present invention, a stamped grid for a battery system is disclosed that offers improved corrosion capabilities and is optimized for electrical performance over other grids known in the art. The stamped grid includes an electrically conductive grid body having opposed top and bottom frame elements, opposed first and second side frame elements and a plurality of interconnecting grid wire elements forming a grid pattern. The grid wire elements include a plurality of vertical wire elements electrically connected to both the top and bottom frame elements, a plurality of vertical wire elements connected to the top frame element and one of either the first or second side frame element and a plurality of cross grid elements that interconnect the vertical wire elements. The vertical wire elements form a radial pattern directed from a common intersection point. In one embodiment, each of the vertical grid elements that is electrically connected to the top frame element and one of either the first or second side frame elements includes a plurality of the cross grid elements connected thereto at a substantially 90 degree angle. In another specific embodiment, the vertical grid elements and the cross grid elements define open areas for supporting electrochemical paste where most of the open areas are within two percent of being the same size.

BRIEF DESCRIPTION OF THE DRAWINGS

The objects and features of this invention will become apparent from a reading of the following detailed description taken in conjunction with the drawings in which.

DETAILED DESCRIPTION OF THE PREFERRED EMBODIMENTS

Figure 1:
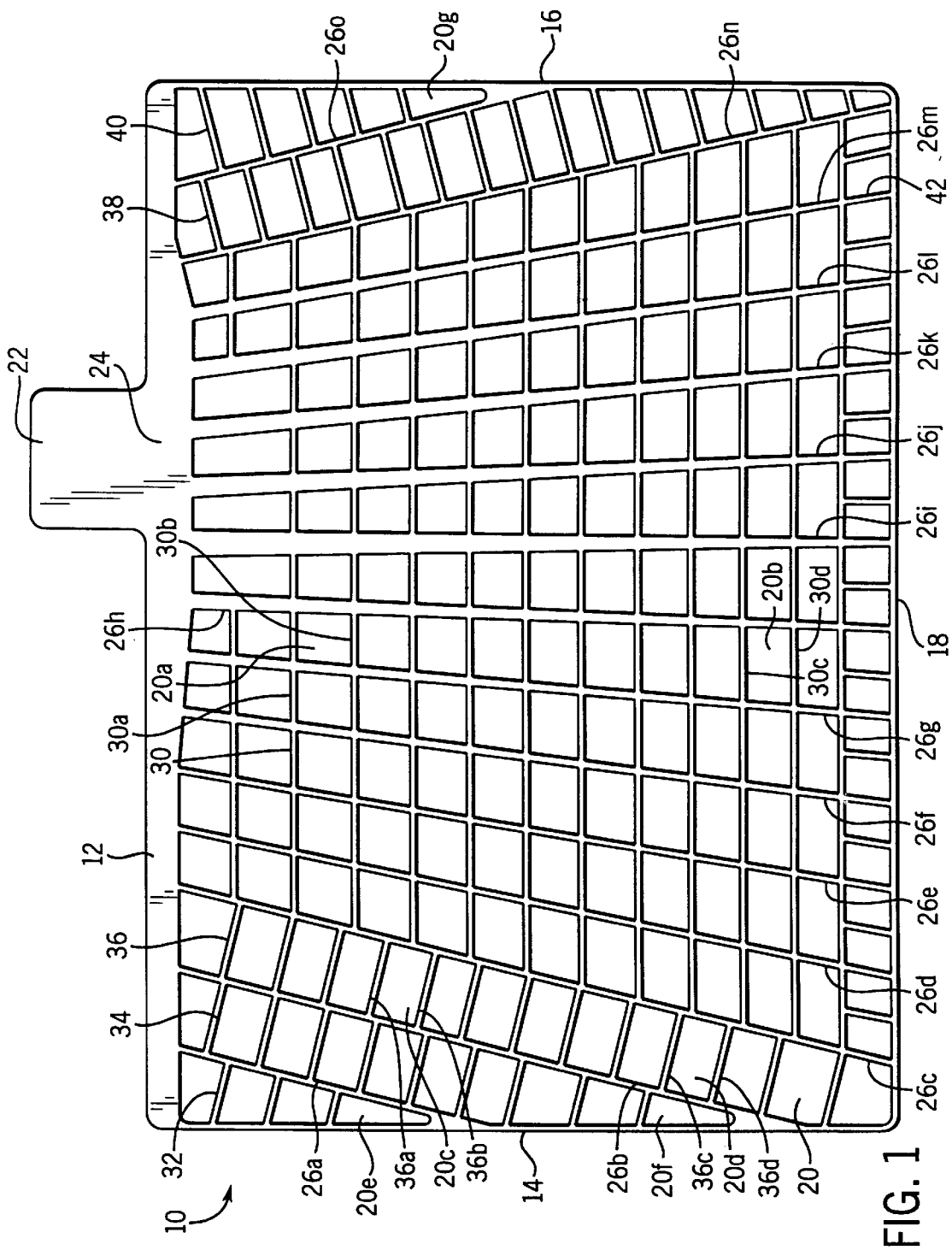
FIG. 1 is a plan view of a stamped lead-alloy battery grid according to the present invention.

The following discussion of the preferred embodiments directed to a stamped grid for a lead-acid battery is merely exemplary in nature, and is in no way intended to limit the invention for its applications or uses.

The present invention is directed to a battery grid formed by a stamping process, that has been optimized for improved corrosion and electrical performance over those grids made by casting or expanded metal processes. The improved corrosion and electrical performance is derived from the grid structure that is formed by the stamping process. These advantages include optimized grid wire patterns, asymmetric and offset grid wire patterns, improved grid wire thickness control (grid wire aspect ratios), improved grid wire shape control, improved lead distribution in the grid (percent lead distribution from the top to the bottom of the grid), and grain control. The corrosion performance is enhanced because of the relatively stress free grain structure and low porosity of the stamped sheet. In addition, the stamping process does not substantially deform the grain or add other stresses into the grid which might lead to corrosion initiation sites. The electrical performance is enhanced as a result of unique and optimized grid wire patterns, improved control of grid wire size and optimized lead distribution within the grid.

The grid is made by stamping, or punching the grid from a continuous sheet of lead material. The sheet may be formed by a continuous casting process or a rolling process depending on which yields the best grain structure for a particular application. The grids are punched to shape while maintaining a continuous strip. The grid shapes will likely result from a progressive punching operation, i.e., features will be added to the grid through several punching operations. The punched strip is processed to add active material (paste) and a paper layer, and then the strip is cut into individual grids. Of course, any particular stamping operation that produces the grid of the present invention is applicable, and is within the scope of the present invention.

The discussion below directed to a battery grid according to the invention has its main application as a grid for a 12-volt lead-acid automobile battery. The discussion below is specific to the grid structure itself, and does not go into a specific application. The grid can be part of a battery plate that may be one of several plates for each of several stacks in a standard battery, as is well understood in the art. Whether the grid is for a positive or negative plate, or whether the battery includes a certain number of plates or stacks, as well as the specific size of the grid, is dependent upon the particular application. A more complete discussion of the complete battery can be found in the '936 patent. The grid can also be used for other applications, such as an electrode for an electrolysis process. For example, the grid can be used in a chloro-alkali process to make chlorine by an electrical current to make polyvinyl chloride. Also, the grid material, typically a lead alloy, may vary from grid to grid, and also forms no part of the present invention.

FIG. 1 shows a front view of a battery grid 10 that may be part of a positive battery plate, for example, according to an embodiment of the present invention. The grid 10 is a stamped grid made of a lead alloy, and functions in substantially the same manner as the grid disclosed in the '936 patent. The grid 10 includes a top frame element 12, first and second side frame elements 14 and 16, and a bottom frame element 18. The grid 10 includes a series of grid wires, as will be discussed below, that define open areas 20 that hold the electrochemical paste (not shown) that provides the current generation. A current collection lug 22 is integral with the top frame element 12 and is offset from the center of the element 12. The top frame element 12 includes an enlarged conductive section 24 directly beneath the lug 22, and has the s hape shown to optimize current conduction to the lug 22. The current collection lug 22 and the enlarged section 24 are shown in the '936 patent.

A series of radially extending vertical grid wire elements 26(a)–26(o) form part of the grid 110, and are substantially configured in the same manner as the vertical wires in the '936 patent. The vertical wire elements 26(c)–26(n) are connected to the top frame element 12 and the bottom frame element 18, the vertical wire elements 26(a) and 26(b) are connected to the top frame element 12 and the first side frame element 14, and the vertical wire element 26(o) is connected to the top frame element 12 and the second side frame element 16, as shown. The vertical wire element 26(i) is parallel to the side elements 14 and 16, and the remaining vertical wire elements 26(a)–26(h) and 26(j)–26(o) extend radially toward an imaginary intersecting point along a radius line running through the vertical element 26(i). The vertical wire elements 26(a)–26(o) become closer together when moving from the bottom element 18 towards the top element 12, and get farther apart when moving towards the left element 14 or the right element 16 from the vertical element 26(i).

The width of the vertical wire elements 26(a)–26(o) increases from the bottom element 18 to the top element 12 to have a tapered shape so as to optimize the current carrying capacity of the wire elements 26(a)–26(o) by the current being generated from the bottom element 18 towards the top element 12. The reduction in the width of the wire elements 26(a)–26(o) towards the bottom element 18, where the current being generated is low, reduces the amount of lead needed, and thus lessens the weight of the battery. The width and spacing of the wire elements 26(a)–26(o) between the side elements 14 and 16 are predetermined so that there are substantially an equal number of potential points across the width of the grid 10. However, the wire elements 26(a)–26(o) can be thinner than the corresponding wires in the '936 patent because the grid 10 is stamped, and thus there is no mold that needs to be optimized for flow of lead to make the grid in the casting process.

The enlarged section 24 increases in size from top to bottom starting at the wire element 26(e) and moving towards the wire element 26(i). Likewise, the enlarged section 24 decreases in size from top to bottom starting at the wire element 26(i) and moving towards the wire element 26(n). These changes in the size and the shape of the enlarged section 24 corresponds to the increased current to be carried to the current collection point of the lug 22, to optimize the efficiency of the current carried by the grid 10. The bigger the cross section of the wire elements in the critical current collection area (below the lug 22) the better the corrosion prevention capabilities, and thus the service life of the grid and battery is extended. Although the amount of lead used in the top frame element 12 is greater than in some designs, the overall lead content in the grid 10 is actually lower since the amount of lead used in the parts of the grid 10 with lower current, such as the wire elements near the bottom portion of the grid 10, is reduced due to the wire elements at the bottom portion being of a lesser width. This supports the feature of substantially equal potential points across the width of the grid 10 in that these points from the center of the lug 22 take the form of essentially an arc to optimize current flow in the grid 10.

The grid in the '936 patent includes a series of horizontal wires that are equally spaced apart and parallel to the top and bottom frame elements of the grid in FIG. 1 of that patent. The majority of the horizontal wires are continuous and are directed straight across the grid, and have this configuration because of the requirements of the casting process. Because the vertical wires are configured radially relative to a center vertical wire, and the horizontal wires are directed straight across the grid, the size of the several open areas defined between the vertical and horizontal wires that hold the conductive paste is different from location to location. Because the open areas have a different area dimension, the power generation in the grid is not uniform, and thus the electrical performance of the battery is not optimized.

The grid 10 also includes a plurality of horizontal or cross wire elements. The cross wire elements include a set of parallel horizontal wire elements 30 positioned in a middle portion of the grid 10. Additionally, the grid 10 includes a first set of cross wire elements 32 connected between the left frame element 14 and the vertical element 26(*a*) that are parallel to each other, a second set of cross wire elements 34 connected between the vertical elements 26(*a*) and 26(*b*) that are parallel to each other, and a third set of cross wire elements 36 connected between the vertical elements 26(*b*) and 26(*c*) that are parallel to each other at the left side of the grid 10. Also, the grid 10 includes a fourth set of cross wire elements 38 connected between the vertical elements 26(*n*) and 26(*o*) that are parallel to each other and a fifth set of cross wire elements 40 connected between the vertical element 26(*o*) and the right frame element 16 that are parallel to each other at the right side of the grid 10, as shown. The angles and numbers of sets of the cross wires 30–40 trace the equal potential contours and may vary with the geometry of the particular grid. A series of short support wires 42 are connected to the bottom frame member 18 as shown. The combination of sections of the vertical wire elements 26(*a*)–26(*o*) and the horizontal wire elements 30 or the cross wire elements 32–40 define the open areas 20 that support the electrochemical paste for conduction. Although a rectilinear grid pattern can achieve the same open areas, it is known in the art that the rectilinear grid is much inferior to a radial grid design.

Because the grid 10 is a stamped member and not a cast member, the different sets of cross wire elements 30–40 are not aligned with each other to be directed straight across the grid 10, but their position is optimized for electrical performance. In accordance with the present invention, the orientation of the plurality of sets of wire elements 30–40 are spaced relative to each other in a top to bottom direction so that most of the open areas 20 have substantially the same size. In one embodiment, 90 percent or more of the open areas 20 have substantially the same size. In other embodiments for other applications, a higher or lower percent of the open areas 20 can have the same size. Also, for one embodiment, the area size of most of the open areas 20 is within two percent of being the same size. Of course, other embodiments for other applications may have other variances in the size of the open areas 20, such as within ten percent of being the same size.

For example, the distance between the horizontal wire elements 30(*a*) and 30(*b*) is greater than the distance between the horizontal wire elements 30(*c*) and 30(*d*) because the distance between the vertical wire elements 26(*g*) and 26(*h*) varies from the top to the bottom of the grid 10, so that the open areas 20(*a*) and 20(*b*) are substantially the same size. Likewise, the open area 20(*c*) defined by the cross wire elements 36(*a*) and 36(*b*) and the vertical wire elements 26(*b*) and 26(*c*) is substantially the same size as the open area 20(*d*) defined by the vertical wire elements 26(*b*) and 26(*c*) and the cross wire elements 36(*c*) and 36(*d*). The cross wire elements 30–40 are positioned so that almost all of the open areas 20 have substantially the same area dimension. This includes the triangular open areas 20(*e*), 20(*f*) and 20(*g*) defined by the side elements 14 and 16 and the respective vertical wire elements and cross wire elements. A few of the open areas near the enlarged section 24 do not satisfy this criteria because of the increased current collection at this area. Because almost all of the open areas 20 have substantially the same size, there is uniform power generation across the entire grid 10 providing increased electrical optimization.

Additionally, because the grid 10 is stamped, the separate cross wire elements 32–40 do not have to be aligned with each other and can be oriented perpendicular to the respective vertical element 26(*a*), 26(*b*), 26(*c*), 26(*n*) and 26(*o*). In other words, instead of making the cross wire elements perpendicular to the side elements as in the '936 patent, the cross elements 32 and 40 are connected to the respective side frame elements 14 and 16 at an angle thereto. The cross elements 32 are perpendicular to the vertical element 26(*a*), the cross elements 34 are perpendicular to the vertical elements 26(*a*) and 26(*b*), the cross elements 36 are perpendicular to the vertical elements 26(*b*) and 26(*c*), the cross elements 38 are perpendicular to the vertical elements 26(*n*) and 26(*o*), and the cross elements 40 are perpendicular to the vertical element 26(*o*). Because these cross elements can be connected perpendicular to the respective vertical wire elements, the cross elements are shorter than the corresponding cross elements disclosed in the '936 patent, and thus have a decrease in weight. Also, by connecting the cross wire elements 30–40 to the vertical elements at substantially 90°, the process for adding the paste is made easier because the sharp angles in the open areas 20 are reduced or eliminated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A grid for a battery comprising an electrically conductive grid body having opposed top and bottom frame elements, opposed first and second side frame elements, and a plurality of interconnecting grid elements defining a grid pattern defining a plurality of open areas, said interconnecting grid elements including a plurality of radially extending vertical grid wire elements connected to the top frame element and a plurality of spaced-apart cross wire grid elements extending between the first and second side frame elements, wherein a plurality of the radially extended vertical grid elements are connected to the top frame element and the bottom frame element or one of either the first or second side frame elements, and the cross grid elements that are connected to the vertical grid elements that are connected to the top frame element and the bottom frame element or the first or second side frame element are connected to the vertical grid element in a staggered manner so that the cross grid elements are not continuous.

2. The grid according to claim 1, wherein a plurality of the radially extended vertical grid elements are connected to the top frame element and the bottom frame element, at least one of the radially extended vertical grid elements are connected to the top frame element and the first side frame element, and at least one vertical grid element is connected to the top frame element and the second side frame element, said vertical grid elements being oriented such that if the vertical grid elements were extended they would intersect at a common imaginary intersection point outside of the grid body.

3. The grid according to claim 1, wherein the radially extended vertical grid elements having a varying width which increases from a bottom of the element connected to the bottom frame element to a top of the element connected to the top frame element.

4. The grid according to claim 1, wherein the size of at least 90% of the open areas is within two percent of each other.

5. The grid according to claim 1, wherein the cross wire elements that are connected to the vertical grid elements that are connected to the top frame element and the first or second side frame elements are connected to the vertical grid elements at substantially a 90° angle thereto.

6. A grid for a battery comprising an electrically conductive grid body having opposed top and bottom frame elements, opposed first and second side frame elements, and a plurality of interconnecting grid elements defining a grid pattern defining a plurality of open areas, said interconnecting grid elements including a plurality of radially extending vertical grid wire elements connected to the top frame element and a plurality of spaced-apart cross wire grid elements extending between the first and second side frame elements, wherein the distance between the cross wire elements varies so that the vertical grid elements and the cross wire grid elements intersect so that at least 90% of the open areas defined by the interconnecting grid elements are within 10% of being the same size, wherein a plurality of the radially extended vertical grid elements are connected to the top frame element and the bottom frame element or one of either the first or second side frame elements, and wherein the cross wire elements that are connected to the vertical grid elements that are connected to the top frame element and the bottom frame element or the first or second side frame elements are connected to the vertical grid elements at substantially a 90° angle thereto, wherein the cross grid elements that are connected to the, vertical grid elements that are connected to the top frame element and the bottom frame element or the first or second side frame element are connected to the vertical grid element in a staggered manner so that the cross frame elements are not continuous.

7. A grid for a battery comprising an electrically conductive grid body having opposed top and bottom frame elements, opposed first and second side frame elements, and a plurality of interconnecting grid elements forming a grid pattern defining a plurality of open areas, wherein the grid elements include a plurality of first vertical grid wire elements electrically connected to both the top and bottom frame elements, a plurality of second vertical grid wire elements electrically connected to the top frame element and one of either the first or second side frame element and a plurality of cross grid elements that interconnect the first vertical grid elements and the second vertical grid elements, and wherein a plurality of the cross grid elements that are connected to each of the second vertical grid elements are connected to the second vertical grid element at substantially a 90° angle thereto, wherein the cross grid elements connected to the second vertical grid elements at 90° angles thereto are configured in a staggered relationship to each other and are not continuous.

8. The grid according to claim 7, wherein the cross grid elements are positioned in the grid so that the distance between the cross grid elements varies so that the second vertical grid elements and the cross grid elements intersect so that at least 90% of the open areas defined by the intersecting grid elements are within 10% of being the same size.

9. The grid according to claim 8, wherein at least 90% of the open areas have a size within a two percent difference of each other.

10. The grid according to claim 7, wherein the plurality of first vertical grid elements and plurality of second vertical grid elements are oriented such that if the first vertical grid elements and the second vertical grid elements were extended they would intersect at a common imaginary intersection point outside of the grid body.

11. The grid according to claim 7, wherein a plurality of the vertical grid elements are formed with a varying width which increases from a bottom of the vertical wire element connected to the bottom frame element to a top of the vertical grid element connected to the top frame element.

12. The grid according to claim 11 wherein the top frame element has an enlarged conductive section that has a greater width than the remaining part of the top frame element.

13. The grid according to claim 12, wherein the vertical grid elements have a decreasing width when moving from the enlarged conductive section of the top frame element towards the first and second side frame elements, said decreasing width being based on the current capacity required due to decreased current flow.

14. The grid according to claim 12 further comprising a current collection lug extending above the top frame element and being positioned over the enlarged conductive section of the top frame element so as to optimize the current flow from the vertical grid elements extending from the bottom frame element to the top frame element.

15. The grid according to claim 14 wherein the current collection lug and the enlarged conductive section of the top frame element are offset from a center location of the top frame element.

16. The grid according to claim 7, wherein the vertical grid elements extending from the bottom frame element to the top frame element have substantially equal current carrying capacity to the lug so as to optimize the current flow in the grid.

17. The grid according to claim 7, wherein the grid elements having a low current flow are spaced farther apart than those grid elements carrying a higher current.

18. The grid according to claim 7, wherein the grid elements having a low current flow are formed with less conductive material than those grid wire elements having a higher current flow.

19. The grid for a battery comprising an electrically conductive grid body having opposed top and bottom frame elements, opposed first and second side frame elements, and a plurality of interconnecting grid elements forming a grid pattern defining a plurality of open areas, said interconnecting grid elements including a plurality of radially extended vertical grid elements connected to the top frame element and a plurality of cross wire grid elements extending between the first and second side frame elements, said radially extended vertical grid elements being oriented such that if the vertical grid elements were extended they would intersected a common intersection plane outside of the grid body, wherein a first plurality of the cross grid elements extend through a plurality of the vertical grid elements at a middle portion of the grid body, a second plurality of the cross grid elements are oriented in a staggered configuration and are not continuous with the first plurality of the cross grid elements at a first side of the grid body adjacent the first side frame element, and a third plurality of the cross grid elements are oriented in a staggered manner and are not continuous with the first plurality of cross grid elements at a second side of the grid body adjacent the second side frame element.

20. The grid according to claim 19 wherein the distance between the cross wire elements varies so that the vertical grid elements and the cross grid elements intersect so that at least 90% of the open areas defined by the interconnecting grid elements are within 10% of being the same size.

21. The grid according to claim 20 wherein at least 90 percent of the open areas are within a two percent size of each other.

22. The grid according to claim 19 wherein a plurality of the radially extended vertical grid elements are connected to the top frame element and one of either the first or second side frame elements, and wherein the cross wire elements that are connected to the vertical grid elements that are connected to the top frame elements and the first or second side frame elements are connected to the vertical grid elements at substantially a 90° angle thereto.

* * * * *

UNITED STATES PATENT AND TRADEMARK OFFICE
CERTIFICATE OF CORRECTION

PATENT NO. : 5,989,749
DATED : November 23, 1999
INVENTOR(S) : Wen-Hong Kao, et al.

It is certified that error appears in the above-identified patent and that said Letters Patent is hereby corrected as shown below:

Title page,

In [56] References Cited

"Gullet" should read --Gullett--.

Column 3, Line 67:

"110" should read --10--.

Claim 6, line 32: "the," should read --the--.

Signed and Sealed this

Tenth Day of April, 2001

Attest:

NICHOLAS P. GODICI

Attesting Officer        Acting Director of the United States Patent and Trademark Office